(12) United States Patent
Han et al.

(10) Patent No.: US 11,984,122 B2
(45) Date of Patent: May 14, 2024

(54) ELECTRONIC APPARATUS AND CONTROLLING METHOD THEREOF

(71) Applicant: SAMSUNG ELECTRONICS CO., LTD., Suwon-si (KR)

(72) Inventors: Youngho Han, Suwon-si (KR); Sangyoon Kim, Suwon-si (KR); Aahwan Kudumula, Suwon-si (KR); Kyungmin Lee, Suwon-si (KR); Donguk Jung, Seoul (KR); Changwoo Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 17/425,560

(22) PCT Filed: Jun. 18, 2021

(86) PCT No.: PCT/KR2021/007655
§ 371 (c)(1),
(2) Date: Jul. 23, 2021

(87) PCT Pub. No.: WO2022/025428
PCT Pub. Date: Feb. 3, 2022

(65) Prior Publication Data
US 2022/0319509 A1    Oct. 6, 2022

(30) Foreign Application Priority Data
Jul. 27, 2020    (KR) .......... 10-2020-0093017

(51) Int. Cl.
*G10L 15/08*    (2006.01)
*G06F 21/31*    (2013.01)
(Continued)

(52) U.S. Cl.
CPC .............. *G10L 15/22* (2013.01); *G06F 21/31* (2013.01); *G06V 30/19093* (2022.01);
(Continued)

(58) Field of Classification Search
None
See application file for complete search history.

(56) References Cited

U.S. PATENT DOCUMENTS 6,513,005 B1 *  1/2003  Qin ....................... G06F 18/256
                                                              704/E15.04
6,556,970 B1     4/2003  Sasaki et al.
(Continued)

FOREIGN PATENT DOCUMENTS

JP    2001/34292    2/2001
JP    2004-94158    3/2004
(Continued)

OTHER PUBLICATIONS

English translation of JP2009116277A. (Year: 2009).*
(Continued)

*Primary Examiner* — Richard Z Zhu
(74) *Attorney, Agent, or Firm* — Nixon & Vanderhye, P.C.

(57) ABSTRACT

Disclosed is a method of controlling an electronic apparatus. The method of controlling an electronic apparatus includes: displaying a screen including an input area configured to receive a text, receiving a speech and obtaining a text corresponding to the speech, performing a service operation corresponding to the input area by inputting the obtained text to the input area, and based on a result of performing the service operation, obtaining a plurality of similar texts including a similar pronunciation with the obtained text, and (Continued)

repeatedly performing the service operation by sequentially inputting the plurality of obtained similar texts to the input area.

13 Claims, 10 Drawing Sheets

(51) Int. Cl.
    *G06V 30/19*     (2022.01)
    *G06V 30/262*     (2022.01)
    *G10L 15/18*     (2013.01)
    *G10L 15/22*     (2006.01)
    *G10L 15/26*     (2006.01)
    *G10L 15/187*     (2013.01)
    *G10L 15/19*     (2013.01)

(52) U.S. Cl.
    CPC ........ *G06V 30/262* (2022.01); *G10L 15/1815* (2013.01); *G10L 15/26* (2013.01); *G10L 15/187* (2013.01); *G10L 15/19* (2013.01); *G10L 2015/221* (2013.01); *G10L 2015/223* (2013.01)

(56) References Cited

U.S. PATENT DOCUMENTS

| | | | |
|---|---|---|---|
| 6,889,191 B2 | 5/2005 | Rodriguez et al. | |
| 8,355,914 B2 | 1/2013 | Joh et al. | |
| 9,245,521 B2 | 1/2016 | Park et al. | |
| 9,589,561 B2 | 3/2017 | Choi et al. | |
| 10,134,387 B2* | 11/2018 | Bouk | G10L 15/005 |
| 10,529,316 B1 | 1/2020 | Cherepanov et al. | |
| 2002/0138265 A1* | 9/2002 | Stevens | G10L 15/22 |
| | | | 704/E15.04 |
| 2005/0159949 A1* | 7/2005 | Yu | G10L 15/065 |
| | | | 704/235 |
| 2008/0126091 A1* | 5/2008 | Clark | H04M 1/271 |
| | | | 704/E15.047 |
| 2009/0299730 A1 | 12/2009 | Joh et al. | |
| 2011/0015927 A1* | 1/2011 | Yu | G10L 15/065 |
| | | | 704/235 |
| 2012/0296627 A1* | 11/2012 | Suzuki | G06F 40/237 |
| | | | 704/2 |
| 2013/0117027 A1 | 5/2013 | Choi et al. | |
| 2016/0063995 A1 | 3/2016 | Choi et al. | |
| 2016/0133248 A1 | 5/2016 | Bouk et al. | |
| 2017/0242832 A1 | 8/2017 | Li et al. | |
| 2017/0263249 A1* | 9/2017 | Akbacak | G06F 21/00 |
| 2018/0315426 A1* | 11/2018 | Oh | G10L 15/22 |
| 2019/0189127 A1* | 6/2019 | Choi | G10L 15/22 |
| 2020/0105247 A1 | 4/2020 | Cherepanov et al. | |

FOREIGN PATENT DOCUMENTS

| | | | |
|---|---|---|---|
| JP | 2009-116277 | | 5/2009 |
| JP | 2009116277 A | * | 5/2009 |
| JP | 2018-72508 | | 5/2018 |
| KR | 10-2009-0123697 | | 12/2009 |
| KR | 10-2014-0005639 | | 1/2014 |
| KR | 10-2016-0025301 | | 3/2016 |
| KR | 10-2016-0056734 | | 5/2016 |
| KR | 10-1789629 | | 11/2017 |
| KR | 10-1819459 | | 1/2018 |

OTHER PUBLICATIONS

International Search Report and Written Opinion dated Sep. 24, 2021 in corresponding International Application No. PCT/KR2021/007655.

* cited by examiner

FIG. 3

| ID SIMILAR TEXT 510 | |
|---|---|
| 1 | abcda |
| 2 | apcd8 |
| 3 | abcd8 |
| 4 | apcta |
| 5 | abcta |
| ⋮ | ⋮ |

| PW SIMILAR TEXT 520 | |
|---|---|
| 1 | 0bthg0 |
| 2 | 0bthgo |
| 3 | obthg0 |
| 4 | obdhg0 |
| 5 | obdhgo |
| ⋮ | ⋮ |

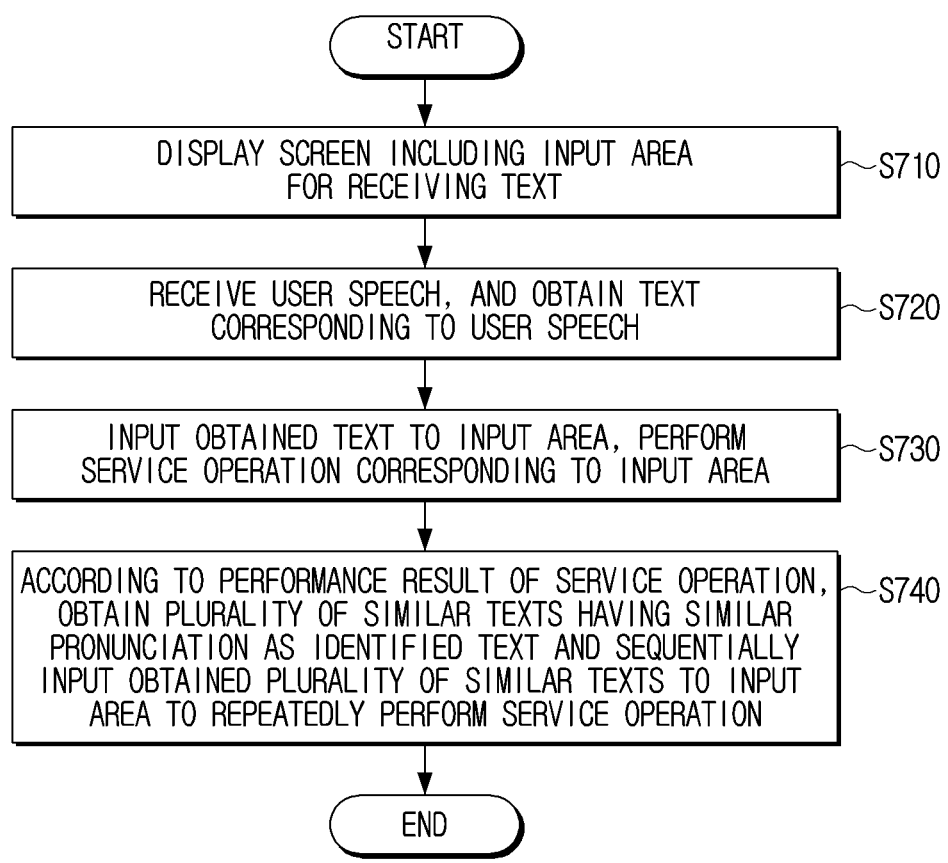

ELECTRONIC APPARATUS AND CONTROLLING METHOD THEREOF

This application is the U.S. national phase of International Application No. PCT/KR2021/007655 filed Jun. 18, 2021 which designated the U.S. and claims priority to KR Patent Application No. 10-2020-0093017 filed Jul. 27, 2020, the entire contents of each of which are hereby incorporated by reference.

BACKGROUND

Field

The disclosure relates to an electronic apparatus and a controlling method thereof and, for example, to an electronic apparatus for recognizing a user speech and a controlling method thereof.

Description of Related Art

Due to the development of electronic technology, speech recognition techniques are widely used. In addition to a smart phone, a speech recognition technology has been applied to a home appliance such as a television (TV), a refrigerator, an air conditioner, or a device inside a vehicle.

However, since the pronunciation of respective users is different, an error that the speech recognition device may incorrectly recognize the speech may occur. Specifically, the speech recognition apparatus may recognize a user speech differently from an intent of the user's utterance, thereby outputting an unintended result. In this case, the user needs to utter a speech again, resulting in user inconvenience. In addition, another error may occur due to re-utterance.

Accordingly, there is an increasing necessity of an electronic apparatus that may provide a result that matches a user's utterance intent by identifying an error as a result of speech recognition and correcting an error, even without re-utterance of user speech.

SUMMARY

Embodiments of the disclosure address at least the above-mentioned problems and embodiments of the disclosure provide an apparatus performing an operation that matches a user's utterance intent by correcting a text obtained as a result of user speech recognition and a controlling method thereof.

According to an example embodiment, a method of controlling an electronic apparatus includes: displaying a screen including an input area configured to receive a text, receiving a speech and obtaining a text corresponding to the speech, performing a service operation corresponding to the input area by inputting the obtained text to the input area, and based on a result of performing the service operation, obtaining a plurality of similar texts including a similar pronunciation with the obtained text, and repeatedly performing the service operation by sequentially inputting the plurality of obtained similar texts to the input area.

According to an example embodiment, an electronic apparatus includes: a display, a communication interface including circuitry configured to establish communication with a remote control device; and a processor configured to: control the display to display a screen including an input area configured to receive a text based on receiving a speech signal through the communication interface, obtain a text corresponding to a speech included in the speech signal, perform a service operation corresponding to the input area by inputting the obtained text to the input area, and based on a result of performing the service operation, obtaining a plurality of similar texts including a similar pronunciation with the obtained text, and repeatedly performing the service operation by sequentially inputting the plurality of obtained similar texts to the input area.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 3 is a diagram illustrating an example pattern information stored in a memory according to various embodiments;

FIG. 7 is a flowchart illustrating an example method for controlling an electronic apparatus according to various embodiments.

DETAILED DESCRIPTION

Figure 1:
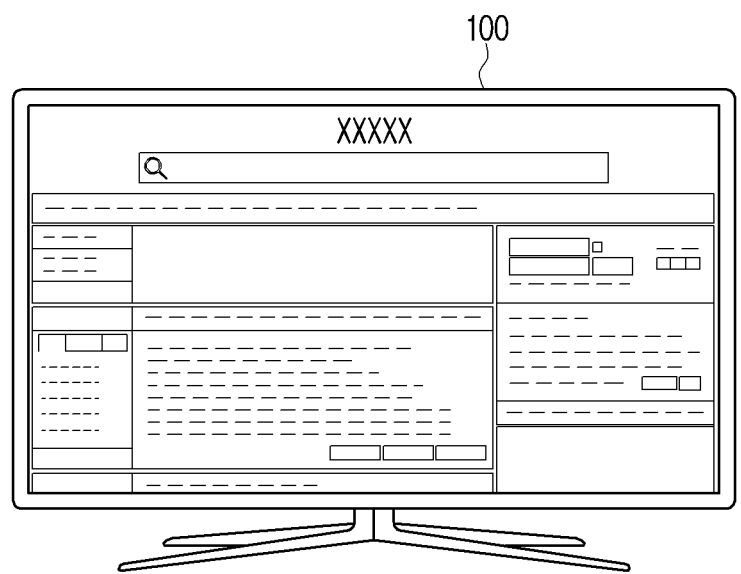
FIG. 1 is a diagram illustrating an example electronic apparatus according various embodiments.
Figure 1:
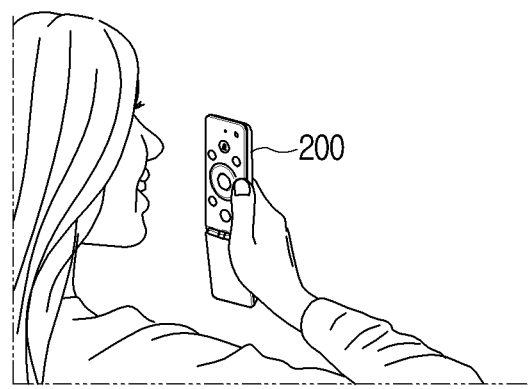

Before describing the disclosure in detail, an overview for understanding the disclosure and drawings will be provided.

The terms used in the present disclosure are general terms identified in consideration of the functions of the various embodiments of the disclosure. However, these terms may vary depending on intention, technical interpretation, emergence of new technologies, and the like of those skilled in the related art. Some terms may be arbitrarily selected, and the meaning thereof will be described in the disclosure. Unless there is a specific definition of a term, the term may be construed based on the overall contents and technological understanding of those skilled in the related art.

Hereinafter, various example embodiments of the disclosure will be described in greater detail with reference to the accompanying drawings. However, this disclosure is not intended to limit the embodiments described herein but includes various modifications, equivalents, and/or alternatives.

Further, like reference numerals indicate like components that perform substantially the same functions throughout the disclosure. For convenience of descriptions and understanding, the same reference numerals or symbols are used and described in different example embodiments. In other words, although elements having the same reference numerals are all illustrated in a plurality of drawings, the plurality of drawings it does not limit the disclosure to a particular embodiment.

A singular expression includes a plural expression, unless otherwise specified. It is to be understood that the terms such as "comprise," "include," or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

In this disclosure, the expressions "have," "may have," "including," or "may include" may be used to denote the presence of a feature (e.g., a component, such as a numerical value, a function, an operation, a part, or the like), and does not exclude the presence of additional features.

In this disclosure, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

The terms such as "first," "second," and so on may be used to describe a variety of elements, but the elements should not be limited by these terms. The terms are simply used for the purpose of distinguishing one element from another. For example, the elements associated with the ordinal numbers are not be limited in order or order of use by the numbers. If necessary, the ordinal numbers may be replaced with each other.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of." The expression "configured to" does not necessarily refer to "specifically designed to" in a hardware sense. Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

In the following description, a "user" may refer to a person using an electronic apparatus or an apparatus using an electronic apparatus (e.g., artificial intelligence electronic apparatus).

Hereinafter, the disclosure will be described in greater detail with reference to drawings.

FIG. 1 is a diagram illustrating an example electronic apparatus according to various embodiments.

Referring to FIG. 1, an electronic apparatus 100 is illustrated as a television (TV), but this is merely an example, and the electronic apparatus 100 according to an embodiment may include, for example, and without limitation, at least one of smartphones, tablet personal computer (PC)s, mobile phones, video telephones, electronic book readers, desktop PCs, laptop PCs, netbook computers, workstations, servers, a personal digital assistant (PDA), a portable multimedia player (PMP), a moving picture experts group phase 1 or phase 2 (MPEG-1 or MPEG-2) audio layer 3 (MP3) player, a kiosk, a medical device, a camera, a wearable device, or the like. A wearable device may include, for example, and without limitation, at least one of the accessory type (e.g., a watch, a ring, a bracelet, a wrinkle bracelet, a necklace, a pair of glasses, a contact lens or a head-mounted-device (HMD)), a fabric or a garment-embedded type (e.g., an electronic clothing), a body-attached type (e.g., a skin pad), a bio-implantable circuit, and the like. The electronic apparatus 100 is not limited to the above examples.

The electronic apparatus 100 may establish communication with a remote control device 200 for controlling the electronic apparatus 100. Referring to FIG. 1, the remote control device 200 is illustrated as being a television (TV) remote controller, but the remote control device 200 is not necessarily limited thereto and may include at least one of smartphones, tablet personal computer (PC), a mobile phone, or a wearable device. Any device that may establish communication with the electronic apparatus 100 may be the remote control device 200 in this disclosure.

The remote control device 200 may control the electronic apparatus 100 by outputting a control command through, for example, infrared or near field communication (e.g., Bluetooth).

The remote control device 200 may receive user speech. The remote control device 200 may receive user speech through a microphone included in the remote control device 200.

The remote control device 200 may convert the received user speech into a user speech signal and transmit the user speech signal to the electronic apparatus 100. The remote control device 200 may convert the received user speech into an electrical signal (e.g., a digital signal, digital data or packet) and transmit the signal to the electronic apparatus 100.

The electronic apparatus 100 may display various screens through a display. The screen displayed on the display may include various input areas, such as, for example, and without limitation, a search word input area, an identification (ID) and a password (PW) input area, or a web site address input area. In the disclosure, the input area may refer, for example, to an area capable of receiving a text including a number, a character, or a symbol, and an area capable of receiving a user input through a keyboard (including a touch keyboard) or a user speech.

When the user utters a speech including characters or words to be input to the input area such as a search word, an ID/password, or a web site address, the remote control device 200 may convert the user speech into a speech signal and transmit the speech signal to the electronic apparatus 100.

The electronic apparatus 100 may perform speech recognition processing on the user speech signal received from the remote control device 200. The electronic apparatus 100 may convert a user speech signal into text and obtain text corresponding to the input area. The electronic apparatus 100 may include an artificial intelligence (AI) system (or a voice recognition model) for recognizing speech. The electronic apparatus 100 may transmit a user speech signal to an external device (e.g., a speech recognition server) (not shown) that includes an AI system for recognizing speech and may receive a speech recognition result for the user speech signal from an external device (not shown).

The electronic apparatus 100 may input text corresponding to the input area obtained as the result of the user speech recognition to an input area included in the screen, and perform service operations (e.g., search, user authentication such as log-in, web page movement, etc.) corresponding to the input area.

FIG. 1 illustrates that the electronic apparatus 100 receives a speech signal from the remote control device 200, but the embodiment is not necessarily limited thereto. For example, the electronic apparatus 100 may directly receive user speech from the user through a microphone embedded or connectable to the electronic apparatus 100.

A configuration and operation of the electronic apparatus 100 will be described in greater detail below with reference to FIGS. 2, 3, 4, 5 and 6A-6C below.

Figure 2:
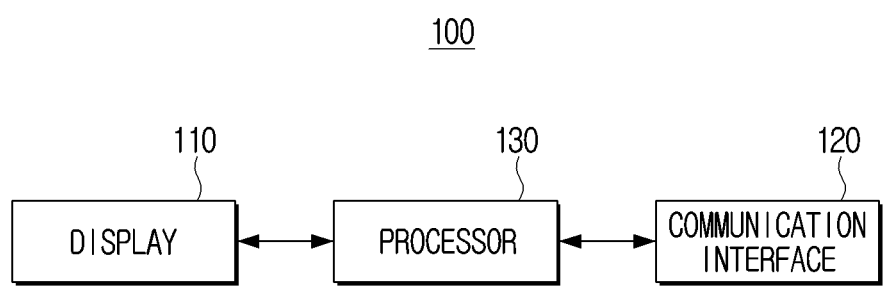
FIG. 2 is a block diagram illustrating an example configuration of an electronic apparatus according to various embodiments.

FIG. 2 is a block diagram illustrating an example configuration of an electronic apparatus according to an embodiment.

Referring to FIG. 2, the electronic apparatus 100 includes a display 110, a communication interface (e.g., including communication circuitry) 120, and a processor (e.g., including processing circuitry) 130.

The display 110 may provide various screens to a user. The screen may include various screens, such as an image, a video text, a variety of content screens such as music, a web page screen, an application execution screen, a screen related to the setting of the electronic apparatus 100, and a graphic user interface (GUI) screen, or the like.

The screen displayed through the display 110 may include an input area for receiving text from the user. The input area displayed on the screen may be one or more.

The display 110 may be implemented as a display of various types such as, for example, and without limitation, a liquid crystal display (LCD), organic light emitting diodes (OLED) display, plasma display panel (PDP), wall, micro light emitting diodes (micro LED), or the like. In the display 110, a backlight unit, a driving circuit which may be implemented as an amorphous silicon thin-film transistor (a-si TFT), low temperature poly silicon (LTPS) TFT, organic TFT (OTFT), or the like, may be included as well. In the meantime, the display 110 may be implemented as a touch screen coupled with a touch sensor, a flexible display, a three-dimensional (3D) display, or the like.

According to an embodiment, the display 110 may include a display panel for outputting an image and a bezel housing a display panel. According to an embodiment, the bezel may include a touch sensor (not shown) for sensing user interaction.

The communication interface 120 may include various communication circuitry configured to perform communication by the electronic apparatus 100 with an external electronic device (not shown) such as a server or the remote control device 200.

The electronic apparatus 100 may receive application information or web page information from an external electronic device (not shown) through the communication interface 120, and may transmit a request for a service performed on an application or a web page to an external electronic device (not shown).

As described in FIG. 1, the electronic apparatus 100 may receive a user speech signal from the remote control device 200 through the communication interface 120.

The communication interface 120 may include various communication modules including various communication circuitry such as a wired communication module (not shown), near-field wireless communication module (not shown), wireless communication module (not shown), or the like.

The wired communication module may refer, for example, to a module for performing communication with an external device (not shown) according to a wired communication method such as wired Ethernet. The near field communication module may refer, for example, to a module for performing communication with an external terminal (not illustrated) positioned at a near distance through near field communication methods such as Bluetooth (BT), Bluetooth low energy (BLE), ZigBee, or the like. The wireless communication module may refer, for example, to a module which communicates by being connected to an external network according to a wireless communication protocol, such as wireless fidelity (Wi-Fi), Institute of Electrical and Electronics Engineers (IEEE) and the like. The wireless communication module may further include a mobile communication module which is connected to a mobile communication network according to various mobile communication standards such as 3rd generation (3G), 3rd generation partnership project (3GPP), long term evolution (LTE), LTE advanced (LTE-A), 5th generation (5G) networks, or the like, to perform communications.

The processor 130 may include various processing circuitry and be electrically connected to a memory (not shown) to control the overall operations and functions of the electronic apparatus 100. For example, the processor 130 may drive an operating system or application program to control hardware or software components connected to the processor 130, and may perform various data processing and operations. The processor 130 may also load and process commands or data received from at least one of the other components into volatile memory and store the various data in non-volatile memory.

For this purpose, the processor 130 may execute one or more software programs stored in a dedicated processor (e.g., embedded processor) for performing the operations or memory device and may be implemented as a general-purpose processor (for example: central processing unit (CPU) or application processor (AP)) capable of performing the corresponding operations.

The processor 130 according to an embodiment may be implemented as, for example, and without limitation, a digital signal processor (DSP) for processing of a digital signal, a microprocessor, a time controller (TCON), or the like, but this is not limited thereto. The processor 130 may include, for example, and without limitation, one or more of a central processor (CPU), a micro controller unit (MCU), a micro-processor (MPU), a controller, an application processor (AP), a communication processor (CP), an address resolution protocol processor (ARP processor), or may be defined as a corresponding term. The processor 130 may be implemented in a system on chip (SoC) type or a large scale integration (LSI) type which a processing algorithm is built therein, or in a field programmable gate array (FPGA) type.

The operation of the processor 130 will be further described below with reference to FIG. 4.

At least one of the components illustrated in the electronic apparatus 100 of FIG. 2 may be added, changed, or deleted in response to the performance and/or type of the electronic apparatus 100. It will be readily understood by those skilled in the art that the location of the components may be changed in response to the performance or structure of the electronic apparatus 100.

For example, the electronic apparatus 100 may further include a microphone (not shown) or a memory (not shown).

When the electronic apparatus 100 includes a microphone (not shown), the communication interface 120 to establish communication with the remote control device 200 may be omitted from the electronic apparatus 100.

A microphone (not shown) may include a component for receiving a speech input. The microphone (not shown) may receive a user speech in an activated state. The microphone (not shown) may be integrally formed in a front direction, an upper direction, or a lateral direction of the electronic apparatus 100. The microphone (not shown) may include various configurations, such as a microphone for collecting user speech in an analog form, an amplifier circuit for amplifying the collected user speech, an analog-to-digital converter (A/D) conversion circuit for sampling the amplified user speech and converting the sampled user speech into a digital signal, a filter circuit for removing a noise component from the converted digital signal, or the like.

The memory (not shown) may include a component for storing various programs, data, or the like, that are necessary for operating the electronic apparatus 100. The memory (not shown) may be implemented as a non-volatile memory, a volatile memory, a flash memory, a hard disk drive (HDD), a solid state drive (SSD), or the like. The memory (not shown) is accessed by the processor 130 and reading/writing/modifying/deleting/updating of data by the processor 130 may be performed. In the disclosure, the term memory may include the memory, read-only memory (ROM) in the processor 130, random access memory (RAM), or a memory card (for example, a micro secure digital (SD) card, and a memory stick) mounted to the electronic apparatus 100.

An AI system for performing a speech recognition service may be stored in a memory (not shown). The memory (not shown) may include an automatic speech recognition (ASR) module that converts a user speech signal received from the remote control device 200 or converted through a microphone (not shown) into text data, and a natural language understanding module (NLU) module that performs syntactic analysis or semantic analysis on the converted text data to identify a user intent.

If the user speech is not clear or due to an environment around the user (e.g., noise), the user speech may not be accurately recognized and a result which is different form the user's intent may occur.

The processor 130 may modify the text corresponding to the user speech using pattern information including information about a character which has a similar pronunciation and may be recognized similarly.

The memory (not shown) may include pattern information for modifying the text corresponding to the user speech.

Figure 3:
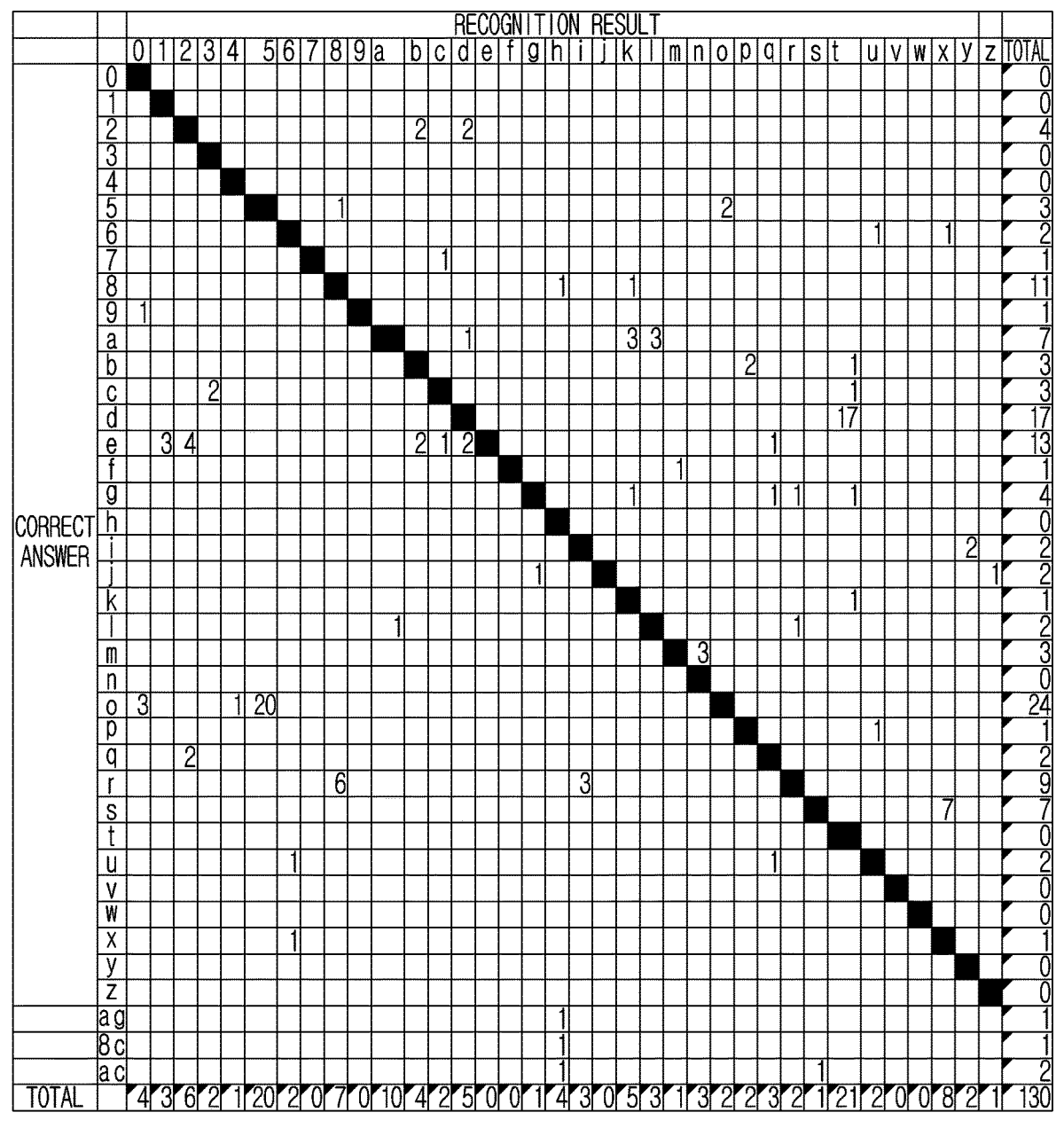

FIG. 3 is a diagram illustrating example pattern information stored in a memory according to various embodiments.

The pattern information may include, for example, and without limitation, at least one of a plurality of character information, character information similar to each of the plurality of characters, and a number of times of misrecognition or probability information for each of the plurality of similar character information. The plurality of character information refers to character information included in the text corresponding to the user speech obtained by the speech recognition result, and includes characters corresponding to a "recognition result" displayed in a column of the table of FIG. 3. The character information similar to each of the plurality of characters refers to characters having similar pronunciation with characters included in the plurality of character information. In that the character information having similar pronunciation with the character (character corresponding to "recognition result") included in the information about the plurality of characters may be the character corresponding to an intended speech when the user utters, the similar character information includes characters corresponding to "correct answer" displayed on a row of the table of FIG. 3. The number of misrecognition times or probability information for each of the plurality of similar character information may refer to the number or probability of misrecognition of the characters which should be recognized as characters included in similar character information ("correct answer" in FIG. 3). For convenience, the table of FIG. 3 illustrates the number of misrecognition for each of the plurality of similar character information. For example, referring to FIG. 3, the number of times of recognizing the alphabet "d" as "t" is 17, and the number of times of recognizing alphabet "O" as the number "5" (in Korean pronunciation) is 20.

Information about a plurality of texts and similar text information may include the number, character, or other various symbols.

The pattern information may be set to a default value when the electronic apparatus 100 is manufactured, and the pattern information may be updated according to the user's utterance habit or the error recognition result. For example, when the user consecutively pronounces alphabets "a" and "g", and if the processor 130 misrecognizes "a" and "g" uttered by the user as alphabet "h", the processor 130 may add "a g" to the row of the pattern information to add the number of times of misrecognition to the cell corresponding to "a g" of the row and "h" of the column.

The pattern information of FIG. 3 refers to a table for a case where the number of alphabet is pronounced with respect to Korean, and the pattern information is not necessarily limited thereto, and may be different according to language of a country where the electronic apparatus 100 is used or according to an embodiment.

Figure 4A:
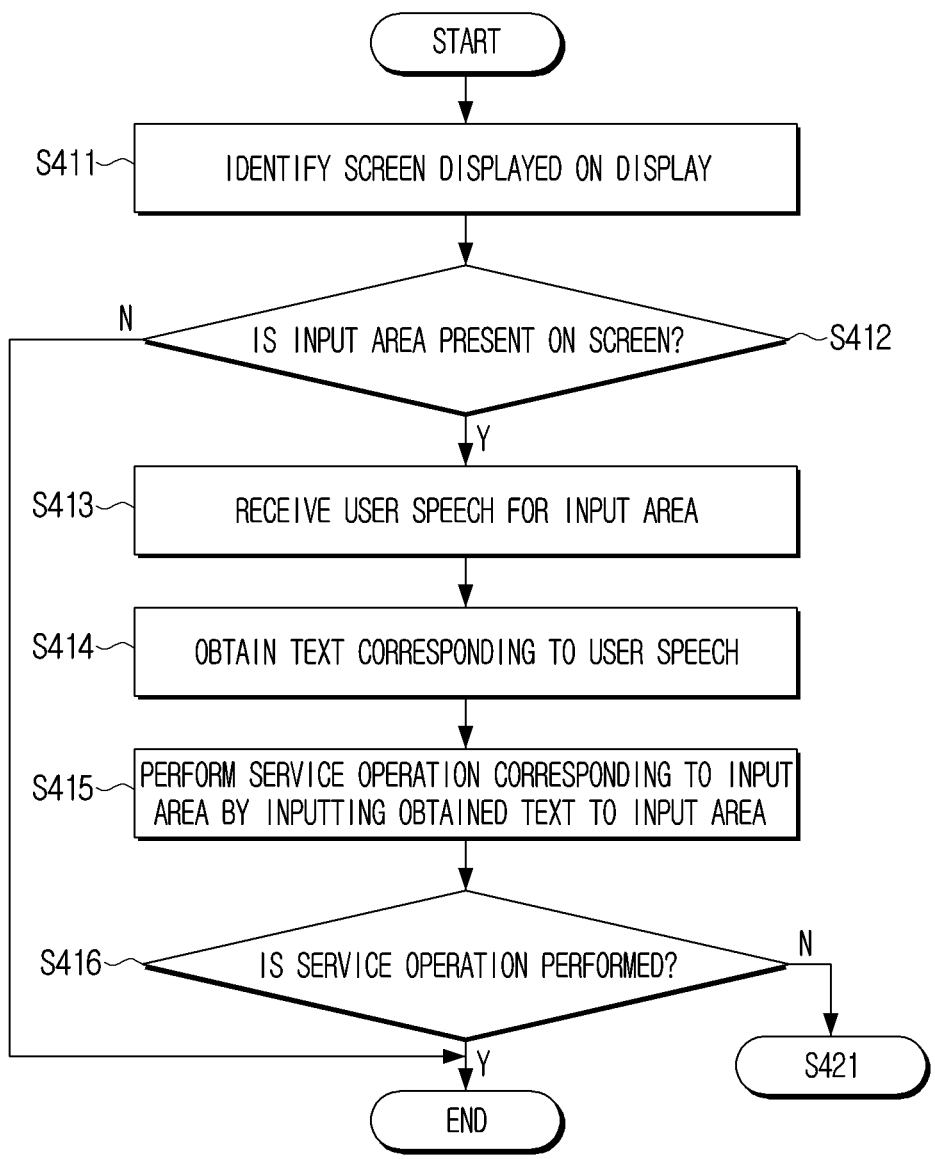
FIGS. 4A and 4B are flowcharts illustrating an example operation of the electronic apparatus according to various embodiments.
Figure 4B:
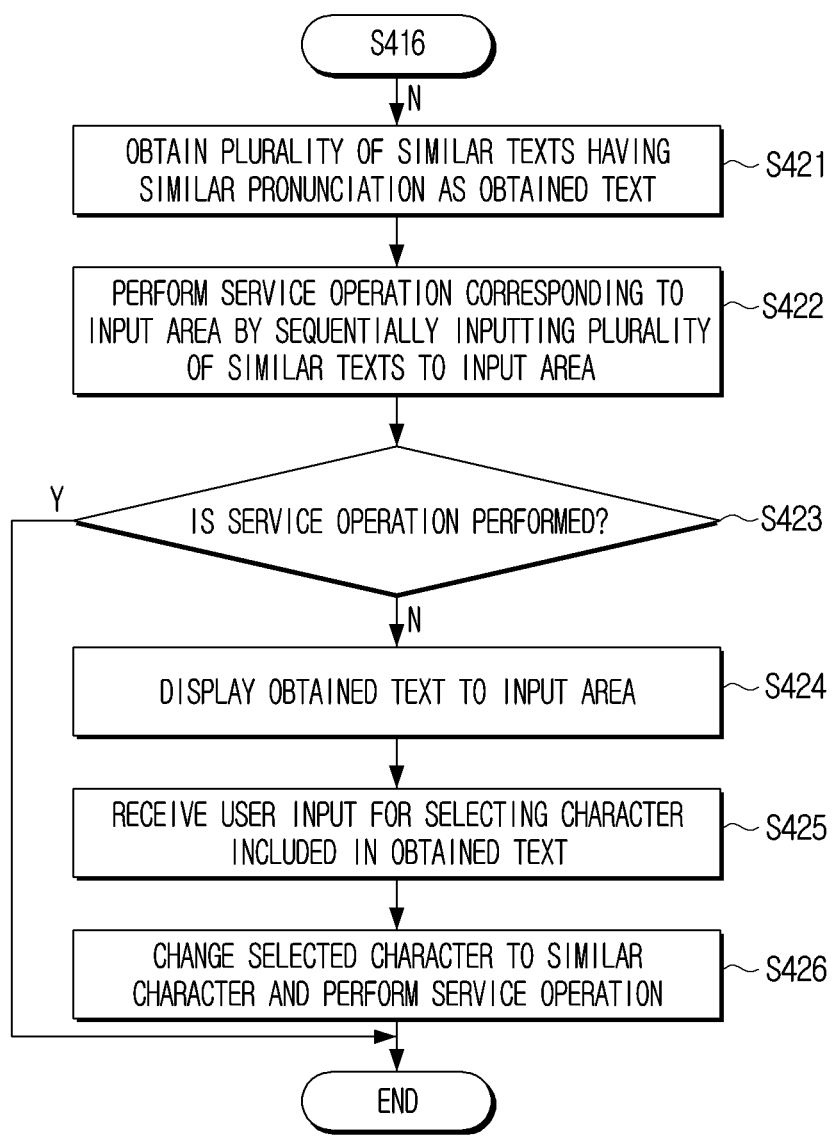

FIGS. 4A and 4B are flowcharts illustrating an example operation of the electronic apparatus according to various embodiments.

The processor 130 may control the display 110 to display a screen including an input area for receiving text. The screen may include various screens, such as a content screen including an image, a video text, music, a web page screen, an application execution screen, a screen related to the setting of the electronic apparatus 100, and a graphic user interface (GUI) screen.

In the disclosure, the input area may refer, for example, to an area capable of receiving a text including, for example, and without limitation, a number, a character, or a symbol, and is an area capable of receiving a user input through a keyboard (including a touch keyboard) or a user speech. For example, the input area may include a search input area of a web page or an application, a webpage address input area, a user ID/PW input area, an access point (AP) address input area of the wireless AP setting screen, the ID/PW input area of a Wi-Fi setting screen, or the like, but the example of the input area is not limited thereto and all the areas in which text may be input may be an input area of the disclosure.

When a screen is displayed on the display 110, the processor 130 may identify a screen displayed on the display 110 in operation S411.

The processor 130 may obtain screen information such as source code information and script information of a screen to identify the type of the screen. For example, the processor 130 may identify whether the screen is a web site screen, a screen of an application, an AP setting screen, or a Wi-Fi setting screen through screen information.

The processor 130 may identify whether an input area exists on a screen through screen information in operation S412. When an input area exists, the processor 130 may identify a type of the input area (e.g., an address input area, an ID input area, a password input area, a search word input area), or a location of an input area on the screen based on screen information.

When a condition for the input area is included in the screen information, the processor 130 may identify a condition for the input area. For example, if there is a limitation on the number of IDs or password inputs, the processor 130 may identify constraints on the number of inputs.

If there is an input area on the screen in operation S412-Y, the processor 130 may receive a user speech for the input area in operation S413. The processor 130 may directly receive user speech through a microphone (not shown) or receive a user speech signal through the communication interface 120.

The processor 130 may perform speech recognition processing for the user speech signal and may obtain a text corresponding to the user speech in operation S414.

Figure 5:
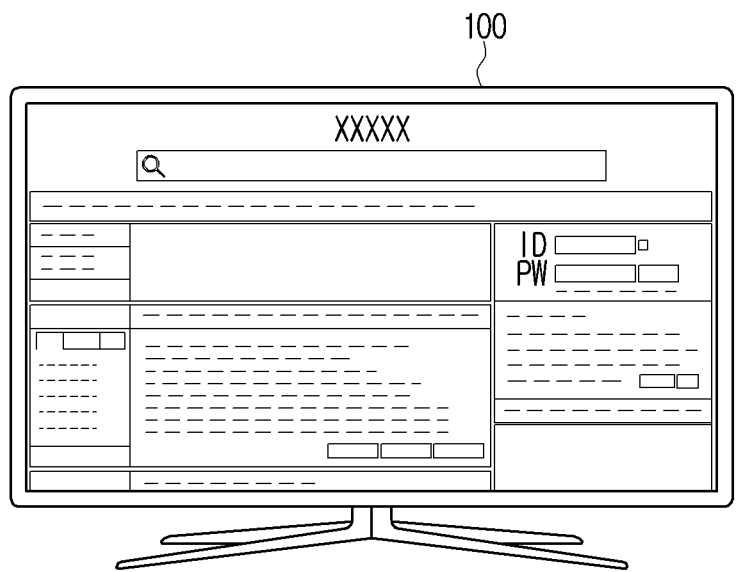
FIG. 5 is a diagram illustrating an example of an electronic apparatus for changing a text obtained from a user speech on a screen including two input areas according to various embodiments.
Figure 5:
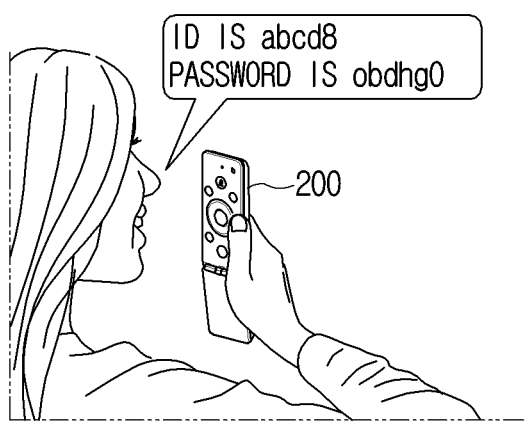

The processor 130 may perform speech recognition processing on the user speech to identify whether the text corresponding to the user speech corresponds to the type of the input area. For example, as shown in FIG. 5, in a state wherein a screen including a search word input area, an ID input area, and a password input area is displayed, if the user utters "ID is abc8 and password is obdhg0", the processor 130 may obtain the text "abc8" as the ID information, and text "obdhg0" as password information as a result of speech recognition, and may recognize the user's intent to input the ID and password. The processor 130 may identify whether an ID input area and a password input area corresponding to the user speech exist on a screen. The processor 130 may identify whether "abc8" and "obdhg0" which are texts corresponding to a user speech on the display 120 correspond to the ID input area and a password input area displayed on a screen.

As a result of identification, if the text corresponding to the user speech corresponds to a type of the input area, the processor 130 may input the text corresponding to the user speech to the input area.

The processor 130 may input the obtained text to the input area to perform a service operation corresponding to the input area in operation S415. For example, the processor 130 may input an ID to an ID input area, input a password to a password input area, to perform an authentication procedure, or input a search word to a search word input area to perform a search service. The processor 130 may determine whether the service operation corresponding to the input area is performed in operation S416.

The processor 130 may, when the service operation is not performed in operation S416, obtain a plurality of texts having a similar pronunciation with the obtained text based on a result of performing the service operation, and may sequentially input the obtained plurality of similar texts to the input area to repeatedly perform a service operation in operations S421, S422.

If it is identified that a service operation corresponding to the input area is not performed as a result of inputting the text obtained as a result of the user speech recognition to the input area, the processor 130 may obtain a plurality of texts having a similar pronunciation as the obtained text and may sequentially input the obtained plurality of similar text to the input area to repeatedly perform the service operation.

The processor 130 may identify that the service operation is not performed when the screen is not switched to a predetermined screen (authentication service), the screen corresponding to the service operation is not present (a search service or a web page moving service), the electronic apparatus 100 is not switched to a specific state (AP setting or Wi-Fi setting), or when the electronic apparatus 100 receives a retry command from the user as a result of input text to the input area, the processor 130 may identify that the service operation is not performed. However, this is merely an example, and the processor 130 may identify whether to perform a service operation in various ways.

The processor 130 may obtain a plurality of similar texts similar to the text corresponding to the user speech using pattern information.

The processor 130 may use the pattern information to change at least one character in the text to another similar character to obtain a plurality of similar texts similar to the text.

The processor 130 may identify at least one character having a similar character in the text using the pattern information, and identify a similar character for each of the at least one identified character. The processor 130 may obtain a plurality of similar texts by changing each of the at least one identified character to a similar character with respect to the respective characters.

For example, the user may utter alphabets "a", "b", "c", and "d", and the texts "a b c t" may be obtained as the user speech recognition result. The processor 130 may identify "a", "b", "c", and "t" having similar characters among the characters included in the text "a b c t" and may identify similar characters for characters "a", "b", "c", and "t", respectively. The processor 130 may identify "1" as a similar character of "a", "2" and "e" as a similar character of "b", "7" and "2" as a similar character of "c", and "b", "c", "d", or the like, as the similar character of "t". The processor 130 may generate similar texts "a b c d" by changing "t" of "a b c t" to "b" or generate similar text "1 b c d" by changing "a" of "a b c t", thereby generating a plurality of similar texts for the text "a b c t."

If all characters included in the text have at least one similar character as described above, the number of similar text that may be generated is increased. The processor 130 may be burdensome to input all similar texts to the input area. Accordingly, the processor 130 may generate a plurality of similar texts based on the number of times or the probability information.

The processor 130 may identify a character, among the plurality of characters in the text, of which information about a number of times of misrecognition or probability information for a similar character satisfies a preset condition using the pattern information and based on the identified character including at least one similar character, change the identified character in the obtained text to the at least one similar character based on information about the number of times of misrecognition or probability information for each of the similar characters. The predetermined condition may be variously set according to an embodiment. For example, the predetermined condition may be two characters having the largest number or probability information, or a character with the number or probability information greater than or equal to a predetermined value (e.g., number of times: 5, a probability of 60%).

Referring to the above example, the information about the number of times of the similar character of "a" out of "a b c t" is 1, the number of times of similar characters "2" and "e" of "b" is 4(=2+2), the number of times of similar characters "7" and "2" of "c" is "2", and the number of times of similar characters "b", "c", "d", "g", and "k" of "t" is 21.

If the predetermined condition is the character with the number of times being greater than or equal to predetermined value 3, the processor 130 may identify 'b" and "t" satisfying a predetermined condition out of "a b c t" and may change "b" and "t" out of "a b c t" to similar characters of "b" and "t", respectively, thereby generating similar texts.

When the identified text is changed to a similar character, the number of times or probability information for each similar character may be used. For example, the processor 130 may generate similar text by substituting a similar character of which the number or probability information of similar characters is greater than or equal to a predetermined value.

The processor 130 may use pattern information even when a similar text is input to the input area. The processor 130 may determine an order of inputting a plurality of similar texts to the input area using the pattern information.

The processor 130 may identify the priority of each of the plurality of similar texts based on the information about the number of times corresponding to similar characters in the similar text for each of the plurality of similar texts, and may repeat the service operation by sequentially inputting the plurality of similar text to the input area based on the identified priority.

For example, there may be similar texts "a b c d' and "l e c t" for "a b c t". The number or probability information corresponding to a similar character in the similar text represents the number of times or probability information that the character in the similar text is recognized as characters in the text, for example, the number or probability information that "d" in the similar text is recognized as "t". The number information for similar text "a b c d" is 17 (when "d" is recognized as "t"), and number information for similar text "l e c t" is 3 (1 when "l" is recognized as "a" and 2 when "e" is recognized as "b"). The processor 130 may assign a higher priority to "a b c d" than the similar text "l e c t", and may perform a service operation by inputting "a b c d" in the input area and then input "l e c t" to the input area when the service operation is not completed after the service operation is performed.

As described above, the processor 130 may obtain text corresponding to the user speech with respect to one input area, and repeatedly input a plurality of similar texts for the obtained text to the input area to repeatedly perform a service operation corresponding to the input area.

In this case, the processor 130 may perform a desired service operation by repeatedly inputting text similar to the text corresponding to the user speech even if an error such as a misrecognition for the user speech recognition has occurred, and the user may not have to re-utter.

According to an embodiment, the screen may include two input areas, and only when the user speech input for the two input areas is satisfied, the service may be performed. For example, a case where identification information (e.g., user ID, Wi-Fi ID, etc.) and a password should be inputted is a representative example.

FIG. 5 is a diagram illustrating an example of an electronic apparatus for changing a text obtained from a user speech on a screen including two input areas according to various embodiments.

The processor 130 may control the display 110 to display a screen including two input areas. The screen may include a first input area for receiving identification information (ID) and a second input area for receiving the password information (PW).

The processor 130 may obtain a first text corresponding to the identification information and a second text corresponding to the password from the user speech. The processor 130 may input the first text to the first input area and input the second text to the second input area to authenticate the identification information.

According to the authentication result, the processor 130 may generate a plurality of first similar texts similar to the first text and a plurality of second similar texts similar to the second text to repeatedly perform authentication for the identification information.

When the first text and the second text are input to the first input region and the second input region, respectively and authentication for identification information fails, the processor 130 may generate a plurality of first similar texts similar to the first text and may obtain a first list 510 including the first text and the plurality of first similar texts. Similarly, the processor 130 may generate a plurality of second similar texts similar to the second text and obtain a second list 520 including the second text and the plurality of second similar texts.

The processor 130 may sequentially input a plurality of texts (first text and a plurality of first similar text) included in the first list 510 and a plurality of texts (second text and a plurality of second similar texts) included in the second list 520 to the first input area and the second input area, respectively, and may repeatedly perform authentication for the identification information.

For example, as shown in FIG. 5, the user may utter "abcd8" as identification information and "obdhg0" as password information. When the processor 130 obtains "abcda" as the first text corresponding to the identification information as a result of user's speech recognition, and obtains "obdhgo" as the second text corresponding to the password, both the recognized first text and the second texts are different from the user's utterance intention and thus, authentication is failed. The processor 130 may generate a second similar text for the first similar text and the second text for the first text. A description of the operation of generating similar text will not be repeated here as a description is provided with reference to S421 and S422 above.

The processor 130 may determine the order of texts to be input to the first input area among the plurality of texts included in the first list 510. Similarly, the processor 130 may determine the order of texts to be input to the second input area among the plurality of texts included in the second list 520.

The processor 130 may determine a priority of each of a plurality of texts included in the first list and a plurality of texts included in the second list using the pattern information. The method for determining the priority of the texts included in the list is the same as or similar to the method for determining the priority of the plurality of similar texts when the input area is one, and thus, redundant description may not be repeated here.

The processor 130 may select one of the plurality of texts based on the priority of the plurality of texts included in the first list, and may sequentially map the selected text based on the priority of the plurality of texts included in the second list and the plurality of texts included in the second list.

For example, as shown in FIG. 5, it is assumed that the priority of the plurality of texts in the first list is given in the order of "abcda", "apcd8", "abcd8", "apcta", "abcta", and the priority of the plurality of texts in the second list is given in the order of "0bthg0", "0bthgo", "obthg0", "obdhg0", "obdhgo".

The processor 130 may preferentially select "abcda" in the first list based on the priority, and sequentially map "abcda" to "0bthg0", "0bthgo", "obthg0", "obdhg0", "obdhgo" based on the priority of the plurality of texts included in the second list and may sequentially input the mapped ("abcda", "0bthg0"), . . . , ("abcda", "obdhgo") to the first input area and the second input area. After the mapping information input for the first priority text "abcda" of the first list is completed, the processor 130 may repeat the same procedure for "apcd8" which is the second priority text of the second list. When the process is repeated, the processor 130 may perform an authentication procedure by inputting ("abcd8", "obdhg0") to the first input area and the second input area, respectively.

By generating a similar text, a service operation corresponding to the input area may be performed, but even if all the generated similar texts are input to the input area, a service operation may not be performed.

The processor 130 may display the obtained text on the input area based on the result of repetitive performing of the service operation, and may change the character included in the text to the similar character based on the user input.

Referring back to FIG. 4B, the processor 130 may change the character included in the text to a similar character based on the user input, if performing of the service operation is not completed in operation S423-N.

If performing of the service operation is not completed in operation S423-N, the processor 130 may display the text obtained as a result of the user speech recognition in the input area in operation S424, and may receive a user input for selecting a character included in the obtained text in operation S425. The processor 130 may receive a user input for selecting a character included in the text from the remote control device 200, or may receive a user input through a microphone (not shown).

When one character among the texts displayed based on the user input is selected, the processor 130 may display a similar character corresponding to the selected character.

If the displayed similar character is selected, the processor 130 may replace the selected character with the similar character as the selected character and display the character on the input area, and may perform a service operation corresponding to the input area in operation S426.

Figure 6A:
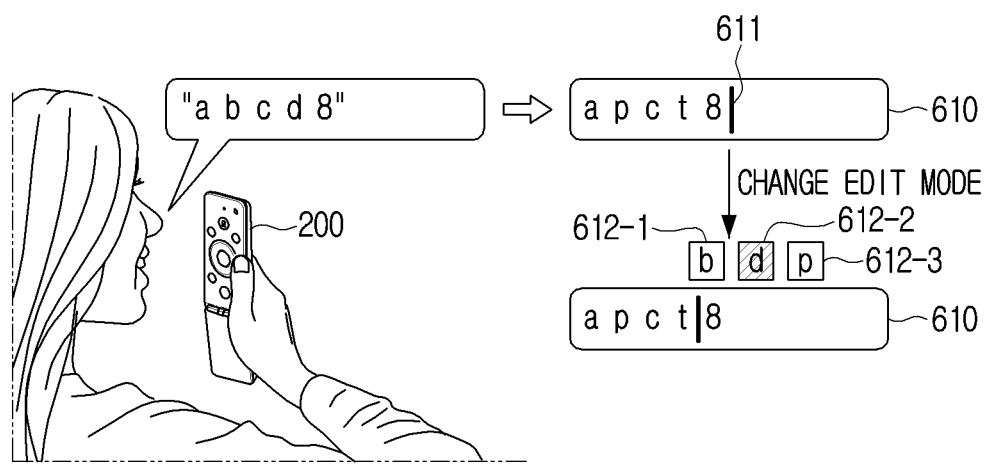
FIGS. 6A, 6B, and 6C are diagrams illustrating an example of an electronic apparatus for changing an obtained text from a user speech based on a user input according to various embodiments.
Figure 6B:
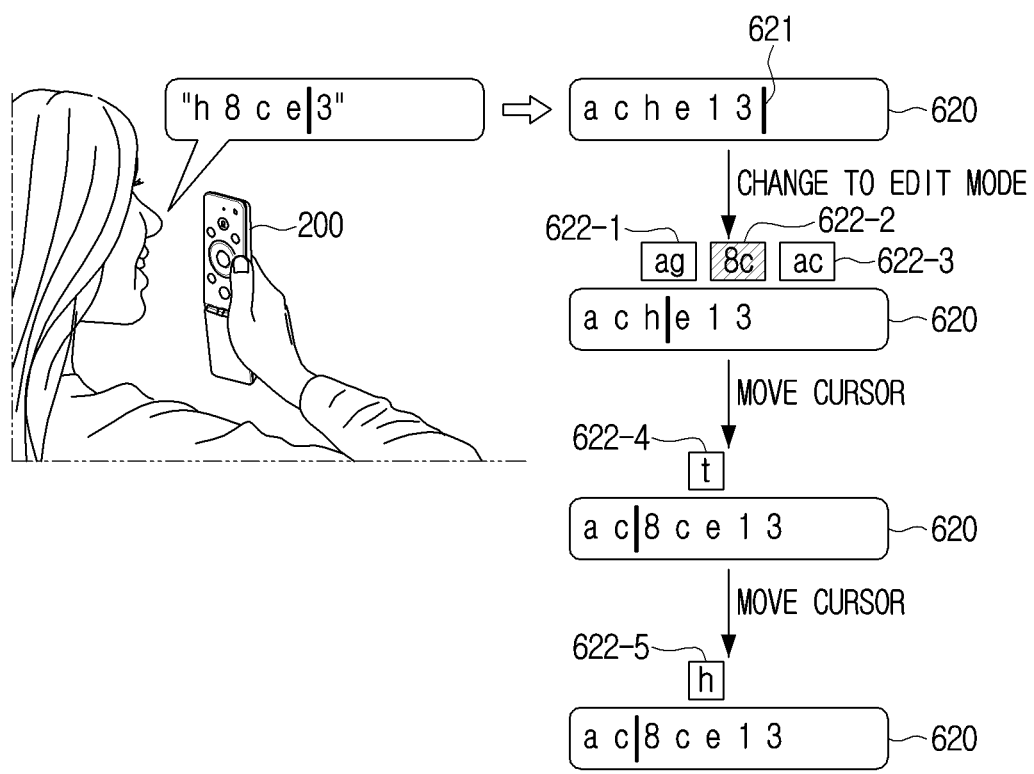
Figure 6C:
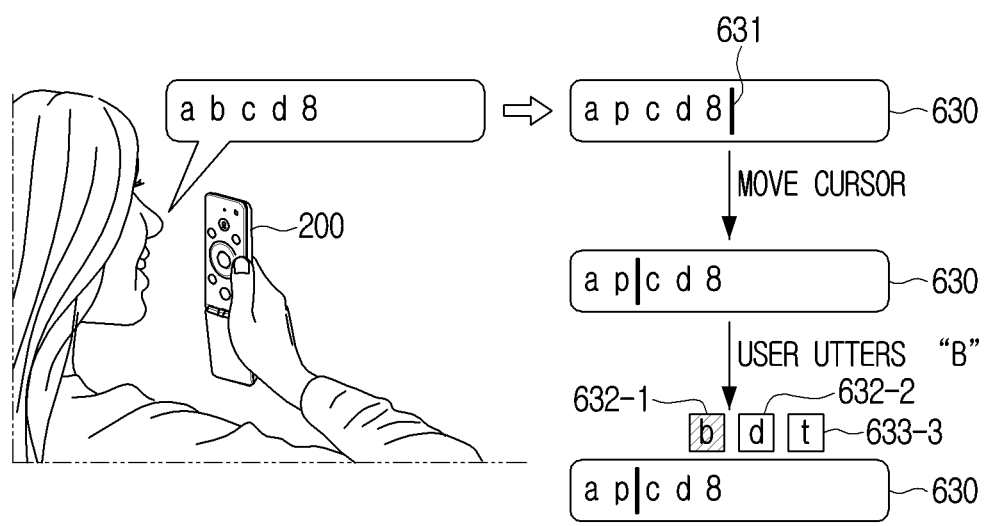

FIGS. 6A, 6B, and 6C are diagrams illustrating an example of an electronic apparatus for changing an obtained text from a user speech based on a user input according to various embodiments.

If the processor 130 receives a voice command from a user, the electronic apparatus 100 may correspond to a command mode. The command mode may refer, for example, to a mode for receiving a user speech signal and inputting text corresponding to the user speech signal to an input area to perform a service corresponding to the input area.

If it is identified that the service operation is not completed by sequentially inputting the text and the plurality of similar text corresponding to the user speech signal in the command mode, the processor 130 may display the text corresponding to the user speech signal in the input area.

Upon receiving, from the remote control device 200, a control command for changing the mode of the electronic apparatus 100 from the command mode to the edit mode through the communication interface 120, the processor 130 may change the mode of the electronic apparatus 100 to the editing mode according to the control command. The editing mode is a mode for changing a portion of the text displayed in the input area based on the user input.

The processor 130 may change the mode of the electronic apparatus 100 from the command mode to the edit mode when a command for moving a cursor 611 of an input area 610 from the remote control device 200 is received.

The remote control device 200 may receive a user input to move the cursor 611 displayed on the screen to a position corresponding to a character to be changed in the text, and may transmit the received user input to the electronic apparatus 100.

When a user input is received through the communication interface 120, the processor 130 may move the cursor 611 to a position corresponding to the character to be changed according to the user input. According to an embodiment, the size, thickness, etc. of a character corresponding to a cursor may be changed or a shadow may be displayed while the cursor moves.

The processor 130 may identify characters 612-1, 612-2, 612-3 having similar pronunciation with characters in which a cursor 611 is located, and may control the display 110 to control the display 110 to display the character at a peripheral area of the input area 610. The processor 130 may identify similar characters displayed in the peripheral area of the input area 610 based on the text corresponding to the user speech and the similar text. The processor 130 may determine similar characters to be displayed in the peripheral region so that the texts do not overlap with the texts that were previously input to the input area and the texts similar therewith.

For example, if the processor 130 moves the cursor 611 to a position corresponding to t according to the user input received from the remote control device 200, the processor 130 may display characters "b" 612-1, "d" 612-2, and "p" 612-3 of which pronunciation is similar to "t" at the peripheral region of the input region 610.

The processor 130 may receive a command for selecting one of a plurality of similar characters from the remote control device 200, replace characters included in the text with a similar character based on the received command, and display the same on the input area. For example, when the processor 130 receives a command for selecting "d" 612-2, the processor 130 may replace "t" of "a p c t 8" to "d" based on the received command, and control the display 110 to display "a p c d 8" in the input area 610.

Two or more consecutive characters having similar pronunciation with respect to one character included in the text or one character having a similar pronunciation with respect to two or more consecutive characters included in the text may be recognized.

Referring to FIG. 6B, the processor 130 may move the cursor 621 to a position corresponding to a character to be changed according to a user command received from the remote control device 200. The description of FIG. 6A may not be repeated for convenience.

There may be two or more consecutive characters having similar pronunciation with one character. When there are two or more consecutive characters having similar pronunciation with one selected character according to a user input, the processor 130 may control the display 110 to display two or more consecutive characters having similar pronunciation for the selected one character in the peripheral area of the input area 620.

For example, based on the mapping information, if "ag" 622-1, "8c" 622-2 and "ac" 622-3 are identified as the characters having similar pronunciation with alphabet "h", the processor 130 may control the display 110 to display the "ag", "8c", and "ac" having similar pronunciation as selected "h" according to the user input on a peripheral area of an input area 620.

There may be an example that two or more consecutive characters correspond one similar character among characters included in the text.

The processor 130 may control the display 110 to display a similar character for two or more consecutive characters included in the text in the peripheral area of the input area 620.

The processor 130 may enlarge the identification area from the cursor to a character placed at a predetermined location, identify whether a character having a similar pronunciation with the character placed in the identification area exists, and may control the display 110 to display characters similar to the identified character.

For example, when the cursor 621 is placed at a position corresponding to "c", the processor 130 may control the processor 130 to display "t" 622-4 which is a character similar to "c", and may enlarge the identification area to a character (e.g., two consecutive characters) placed at a predetermined location from the cursor to identify whether a character having a similar pronunciation as "ac" exists, and may display the identified similar character "h" 622-5 in the peripheral area of the input area 620.

The processor 130 may display a similar character based on the user speech input.

FIG. 6C is a diagram illustrating an embodiment of displaying similar characters based on the user speech input. The description of FIG. 6C overlapping with FIGS. 6A and 6B may not be repeated here.

The processor 130 may move a cursor 631 of the input area 630 based on a command received from the remote control device 200 and may receive a user speech. The cursor may be moved to a position corresponding to a character to be changed by a user, and the user speech may correspond to a character to be changed.

The processor 130 may control the display 110 to display characters 632-1, 632-2, and 633-3, similar to the user speech, in the peripheral area of the input area 630 when receiving the user speech.

The processor 130 may change the character of the input area according to the user input to select one of similar characters.

FIG. 7 is a flowchart illustrating an example method for controlling an electronic apparatus according to various embodiments.

A screen including an input area for receiving text is displayed in operation S710. The input area displayed on the screen may be one or more. The screen may include a first input area receiving identification information and a second input area receiving a password.

The screen information on the screen may be obtained based on screen information such as source code information and script information of a screen. Based on the obtained screen information, the type of the screen, the existence of the input area, and the type of the input area may be identified when the input area exists.

The user speech may be received, and text corresponding to the received user speech may be obtained in operation S720. The speech recognition process for a user speech may be performed to obtain a text corresponding to the user speech, and whether a text corresponding to the user speech corresponds to the type of the input area may be identified.

When the input areas are in plural, the first text corresponding to the identification information and the second text corresponding to the password may be obtained from the user speech.

By inputting the obtained text to the input area, a service operation corresponding to the input area may be performed in operation S730.

For example, the text corresponding to the user speech may be input to the input area based on the result of identifying whether the text corresponding to the user speech corresponds to the type of the input area.

The first input area corresponding to the identification information and the second input area corresponding to the password information may be displayed on a screen, and when a first text corresponding to the identification information and a second text corresponding to the password is obtained from the user speech, the first text may be inputted to the first input area and the second text may be inputted to the second input area to perform authentication on the identification information.

According to the performance result of the service operation, a plurality of similar texts having similar pronunciation as the identified text may be obtained and the obtained plurality of similar texts may be sequentially input to the input area to repeatedly perform the service operation in operation S740.

For example, a plurality of similar texts may be obtained by changing at least one character in the obtained text to another similar character using pattern information including at least one of a plurality of character information, similar character information similar to each of a plurality of characters included in the plurality of character information, and the number of times information for each of the plurality of similar character information.

Using the pattern information, at least one character having a similar character, among characters in the text, may be identified, and similar characters for each of the identified at least one character may be identified.

A plurality of similar texts may be obtained by changing each of the identified at least one character into a similar character for each character in the obtained text.

According to an embodiment, the character of which number or probability information for a similar character among a plurality of characters in the text may be identified using the pattern information. When the identified character has at least one similar character, the identified character in the obtained text based on the information about times for each of the similar characters may be changed into at least one similar character.

In consideration of the priority of the text, the order of texts input to the input area may be considered.

The priority of each of the plurality of similar texts may be identified based on the number information corresponding to similar characters in the similar text for each of the plurality of similar texts, and the service operation may be repeated by sequentially inputting the plurality of similar texts to the input area based on the identified priority.

If the first input area corresponding to the identification information and the second input area corresponding to the password information are displayed on a screen, and when the first text corresponding to the identification information and the second text corresponding to the password are obtained from the user speech, according to the authentication result, a first list including the first text and a plurality of first similar texts having a similar pronunciation as the first text and a second list including the second text and a plurality of second similar texts having a similar pronunciation as the second text may be obtained, and authentication about the identification information may be performed by sequentially inputting a plurality of texts included in the first list and a plurality of texts included in the second similar text to the first input area and the second input area, respectively.

According to an embodiment, the priority of each of the plurality of texts included in the first list and the plurality of texts included in the second list may be determined using the pattern information.

One of a plurality of texts included may be selected based on the priority of the plurality of texts included in the first list, and a plurality of texts included in the second list may be sequentially mapped with the selected texts based on the priority of the plurality of text included in the second list.

By sequentially inputting the mapped texts of the first list and the text of the second list to the first input area and the second input area, respectively, to repeatedly perform authentication.

As described above, the obtained text may be displayed in the input area based on the result of repeatedly performing the service operation.

When one of the displayed texts is selected, a similar character corresponding to the selected character may be displayed.

When the displayed similar character is selected, the selected character of the obtained text may be replaced with the selected similar character and displayed on the input area.

The electronic apparatus 100 or various operations described as being performed through the electronic apparatus 100 may be performed through one or more electronic apparatuses in a form of a method of controlling an electronic apparatus or a method of operating the electronic apparatus.

The various embodiments described above may be implemented in a medium readable by computer or a similar device using software, hardware, or the combination of software and hardware.

By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions.

In some cases, embodiments described herein may be implemented by the processor. According to a software implementation, embodiments, such as the procedures and functions described herein, may be implemented with separate software modules. Each of the above-described software modules may perform one or more of the functions and operations described herein.

The computer instructions for performing the processing operations of the user device or administrator device according to the various embodiments described above may be stored in a non-transitory computer-readable medium. The computer instructions stored in this non-transitory computer-readable medium may cause the above-described specific device to perform the processing operations in the electronic apparatus 100 according to the above-described various example embodiments when executed by the processor of the device.

The non-transitory computer readable medium may refer, for example, to a medium that stores data semi-permanently, and is readable by an apparatus. The aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the including the appended claims and their equivalents.

What is claimed is:

1. A method of controlling an electronic apparatus, the method comprising:
displaying a screen including an input area configured to receive a text;
receiving a speech and obtaining a text corresponding to the speech;
performing a service operation corresponding to the input area by inputting the obtained text to the input area; and
based on a result of performing the service operation, obtaining a plurality of similar texts including a similar pronunciation with the obtained text, and repeatedly performing the service operation by sequentially inputting the plurality of obtained similar texts to the input area,
wherein the screen comprises a first input area configured to receive identification information and a second input area configured to receive password information,
wherein the obtaining comprises:
obtaining a first text corresponding to identification information and a second text corresponding to a password from the speech,
wherein the performing the service operation comprises:
performing authentication about the identification information by inputting the first text to the first input area and inputting the second text to the second input area, and wherein the repeatedly performing comprises:
according to the authentication result, obtaining a first list including the first text and a plurality of first similar texts having a similar pronunciation as the first text and a second list including the second text and a plurality of second similar texts having a similar pronunciation as the second text, and repeatedly performing authentication about the identification information by sequentially inputting a plurality of texts included in the first list and a plurality of texts included in the second similar text to the first input area and the second input area, respectively.

2. The method of claim 1, wherein the repeatedly performing comprises: obtaining a plurality of similar texts by changing at least one character in the obtained text to another similar character using at least one of information about a plurality of characters, information about similar characters similar to the plurality of characters, respectively, included in the information about the plurality of characters, and information about a number of times of misrecognition for each of the information about a plurality of similar characters.

3. The method of claim 2, wherein the obtaining the plurality of similar texts comprises:
identifying at least one character having a similar character among the characters in the text using pattern information;
identifying a similar character for each of the at least one identified character; and obtaining a plurality of similar texts by changing each of the at least one identified character to a similar character with respect to the respective character in the obtained text.

4. The method of claim 2, wherein the obtaining the plurality of similar texts comprises:
identifying a character, among the plurality of characters in the text obtained from the speech, of which information about number of times of misrecognition for a similar character satisfies a preset condition using pattern information; and
based on the identified character including at least one similar character, changing the identified character in the obtained text to the at least one similar character based on information about number of times of misrecognition for each of the similar characters.

5. The method of claim 2, wherein the repeatedly performing comprises:
identifying a priority of each of the plurality of similar texts based on the information about the number of times of misrecognition corresponding to the similar character in a similar text for each of the plurality of similar texts; and
repeating the service operation by sequentially inputting the plurality of similar texts to the input area based on the identified priority.

6. The method of claim 1, wherein the repeatedly performing the authentication comprises:
determining a priority of each of a plurality of texts included the first list and each of a plurality of texts included in the second list using pattern information including at least one of information about a plurality of characters, information about similar characters similar to each of the plurality of characters, and information about a number of times of misrecognition for each of the information about a plurality of similar characters;
selecting one of the plurality of texts based on a priority of a plurality of texts included in the first list;
sequentially mapping the selected text and a plurality of texts included in the second list based on the priority of a plurality of texts included in the second list; and
sequentially inputting the mapped text of the first list and the text of the second list to the first input area and the second input area, respectively.

7. The method of claim 1, further comprising:
obtaining screen information about the screen; and
identifying a type of an input area included in the screen based on the obtained screen information,
wherein the obtaining the text comprises: identifying whether the text corresponding to the speech corresponds to the type of the input area by performing speech recognition processing for the speech,
wherein the performing the service operation comprises inputting the text corresponding to the speech to the input area based on the identification result.

8. The method of claim 1, further comprising:
displaying the obtained text on the input area based on a result of performing the repetitive service operation;
based on one character of the displayed text being selected, displaying a similar character corresponding to the selected character; and
based on the displayed similar character being selected, replacing the selected character of the obtained text with the selected similar character and displaying the replaced character on the input area.

9. An electronic apparatus comprising:
a display;
a communication interface comprising circuitry configured to establish communication with a remote control device; and
a processor configured to:
control the display to display a screen including an input area configured to receive a text,
based on receiving a speech signal through the communication interface, obtain a text corresponding to a speech included in the speech signal,
perform a service operation corresponding to the input area by inputting the obtained text to the input area, and
based on a result of performing the service operation, obtaining a plurality of similar texts including a similar pronunciation with the obtained text, and repeatedly performing the service operation by sequentially inputting the plurality of obtained similar texts to the input area,
wherein the screen comprises a first input area configured to receive identification information and a second input area configured to receive password information, and
wherein the processor is further configured to:
obtain a first text corresponding to identification information and a second text corresponding to a password from the speech,
perform authentication about the identification information by inputting the first text to the first input area and inputting the second text to the second input area, and
based on the authentication result, obtain a first list including the first text and a plurality of first similar texts having a similar pronunciation as the first text and a second list including the second text and a plurality of second similar texts having a similar pronunciation as the second text, and repeatedly perform authentication about the identification information by sequentially inputting a plurality of texts included in the first list and a plurality of texts included in the second similar text to the first input area and the second input area, respectively.

10. The electronic apparatus of claim 9, further comprising:
a memory storing pattern information including at least one of information about a plurality of characters, information about similar characters similar to each of the plurality of characters, and information about a number of times of misrecognition for each of the information about a plurality of similar characters,
wherein the processor is further configured to obtain a plurality of similar texts by changing at least one character in the obtained text to another similar character using the pattern information.

11. The electronic apparatus of claim 10, wherein the processor is further configured to:
identify at least one character having a similar character in the text using the pattern information,
identify a similar character for each of the at least one identified character, and obtain a plurality of similar texts by changing each of the at least one identified character to a similar character with respect to the respective character in the obtained text.

12. The electronic apparatus of claim 10, wherein the processor is further configured to: identify a character, among the plurality of characters in the text obtained from the speech, of which information about a number of times of misrecognition for a similar character satisfies a preset condition using the pattern information and based on the identified character including at least one similar character, change the identified character in the obtained text to the at least one similar character based on information about the number of times of misrecognition for each of the similar characters.

13. The electronic apparatus of claim 10, wherein a priority of each of the plurality of similar texts is identified based on the information about number of times of misrecognition corresponding to the similar character in a similar text for each of the plurality of similar texts, and the service operation is repeated by sequentially inputting the plurality of similar texts to the input area based on the identified priority.

\* \* \* \* \*